(12) United States Patent
Buckhouse et al.

(10) Patent No.: US 6,843,493 B2
(45) Date of Patent: Jan. 18, 2005

(54) FASTENER COVER

(75) Inventors: Eric R. Buckhouse, Racine, WI (US); Jeff W. Hughes, Loves Park, IL (US)

(73) Assignee: Harley-Davidson Motor Company Group, Inc., Milwaukee, WI (US)

(*) Notice: Subject to any disclaimer, the term of this patent is extended or adjusted under 35 U.S.C. 154(b) by 0 days.

(21) Appl. No.: 10/411,478

(22) Filed: Apr. 10, 2003

(65) Prior Publication Data

US 2004/0201198 A1 Oct. 14, 2004

(51) Int. Cl.$^7$ .............................................. B62K 21/22
(52) U.S. Cl. ...................................... 280/279; 180/219
(58) Field of Search ............................. 280/274, 276, 280/279, 280, 270; 180/219; 150/167

(56) References Cited

U.S. PATENT DOCUMENTS

| | | | | |
|---|---|---|---|---|
| 4,322,087 A | * | 3/1982 | Addicks | 280/279 |
| 5,085,063 A | * | 2/1992 | Van Dyke et al. | 70/218 |
| 5,301,973 A | * | 4/1994 | Truchinski | 280/276 |
| 5,536,104 A | * | 7/1996 | Chen | 403/370 |
| 5,857,689 A | * | 1/1999 | Chien | 280/276 |
| 6,155,370 A | * | 12/2000 | Iwai et al. | 180/222 |
| 6,176,339 B1 | * | 1/2001 | Reichardt | 180/219 |
| 6,332,625 B1 | * | 12/2001 | Fukunaga et al. | 280/280 |

OTHER PUBLICATIONS

V–Twin, 1993 Uniquely V–Twin Manufacturing Catalog, p. 204, published prior to Jan. 1, 1994.
Harley–Davidson, 1993/94 Sportster Five–Speed/Belt Drive Parts Catalog—All Models, Part No. 99451–94, p. 60, published prior to Jan. 1, 1994.
Harley–Davidson, 1994 Harley–Davidson Genuine Parts & Accessories Catalog, p. 96, published prior to Jan. 1, 1995.
Custom Chrome, 94 Custom Chrome Catalog, p. 568, published prior to Jan. 1, 1995.

* cited by examiner

*Primary Examiner*—Avraham Lerner
(74) *Attorney, Agent, or Firm*—Michael Best & Friedrich, LLP

(57) ABSTRACT

A motorcycle including a frame and a triple clamp supported by the frame for rotation relative to the frame. The motorcycle includes an engaging member, a triple clamp fastener, and a cover. The engaging member includes a first engagement portion and is positioned between the triple clamp fastener and the surface of the triple clamp. The cover includes a second engagement portion that engages the first engagement portion to cover at least a portion of the triple clamp fastener.

25 Claims, 3 Drawing Sheets

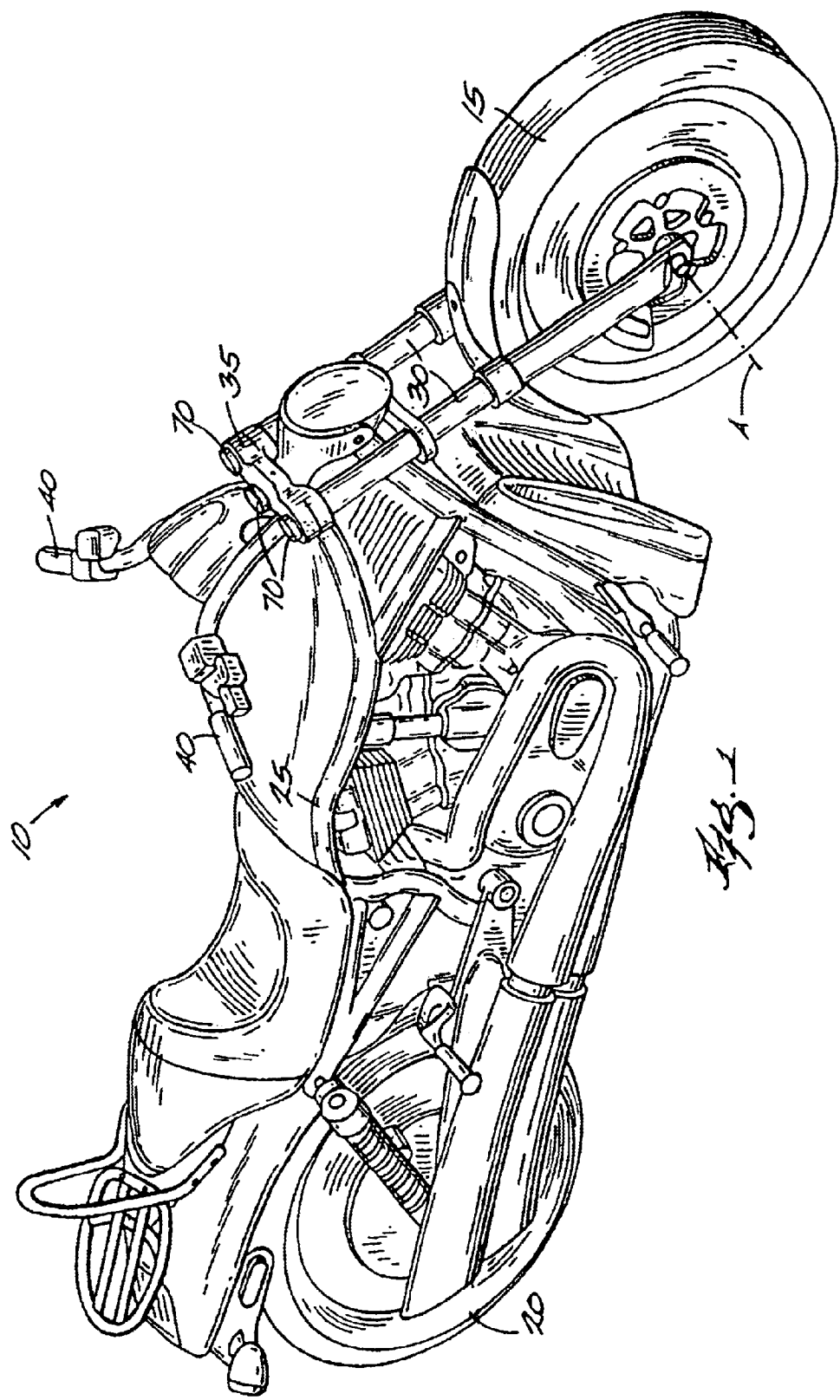

FASTENER COVER

BACKGROUND OF THE INVENTION

The present invention generally relates to motorcycles, and particularly to motorcycles including a triple clamp for supporting a pair of forks.

Motorcycles generally include a front wheel supported by one or more fork tubes for rotation. Often the fork tubes are supported by a triple clamp that is pivotally attached to the motorcycle frame through a steering stem. Handlebars are coupled to the triple clamp to allow the rider to turn the fork tubes and front wheel to steer the motorcycle. The fork tubes and the steering stem attach to the triple clamp using triple clamp fasteners, such as nuts or bolts, that are commonly exposed on the top surface of the triple clamp.

SUMMARY OF THE PREFERRED EMBODIMENT

The present invention provides a fastener cover assembly that is designed to cover a triple clamp fastener, thereby providing a protective and cosmetic cover over the triple clamp fastener. In one aspect, the cover assembly includes an engaging member (e.g., a washer) positioned between at least a portion of the triple clamp fastener and the top surface of the triple clamp. The cover assembly also includes a cover coupled to the engaging member and covering at least a portion of the triple clamp fastener. In one embodiment, an interior portion of the cover is secured to an exterior portion of the engaging member. For example, the interior and exterior portions can be threaded to engage each other.

BRIEF DESCRIPTION OF THE DRAWINGS

The detailed description particularly refers to the accompanying figures in which:

FIG. 4 is a section view taken along line 4—4 of FIG. 2; and

Figure 2:
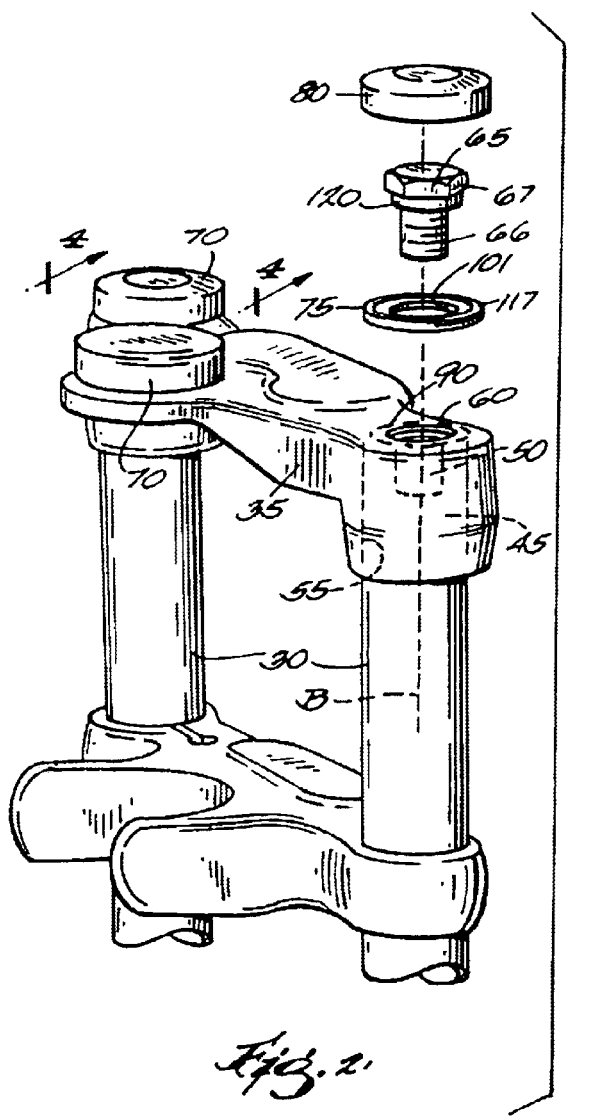
FIG. 2 is a partially exploded perspective view of the triple clamp and fastener cover assemblies of FIG. 1.

Before embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION OF THE DRAWINGS

Figure 1:
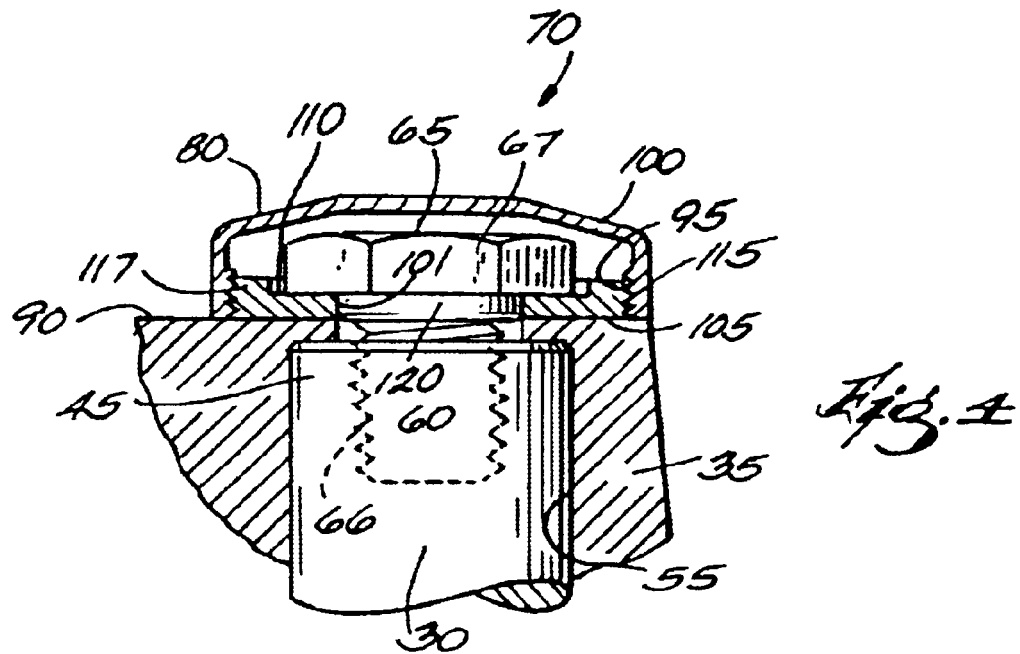
FIG. 1 is a perspective view of a motorcycle including a triple clamp and fastener cover assemblies.

FIG. 1 illustrates a motorcycle 10 embodying the present invention. The motorcycle 10 includes a front wheel 15 and a rear wheel 20 supported for rotation by a frame 25. Two fork tubes 30 cooperate to support the front wheel 15 and to define an axis of rotation A for the front wheel 15. The fork tubes 30 attach to a triple clamp 35 that is pivotally supported by the frame 25 through a steering stem (not shown). Handlebars 40 attach to the triple clamp 35 to allow the rider to pivot the triple clamp 35 to turn the front wheel 15 and steer the motorcycle 10.

Turning to FIG. 2, each fork tube 30 includes a first end 45 having a threaded bore 50 that facilitates attachment to the triple clamp 35. The first end 45 fits into a recess or pocket 55 within the triple clamp 35. The pocket 55 inhibits movement of the fork tube 30 in directions perpendicular to the fork tube's longitudinal axis B. An aperture 60 in the triple clamp 35 aligns with the threaded bore 50 in the first end 45 of the fork tube 30 and receives a triple clamp fastener in the form of a fork bolt 65. The fork bolt 65 includes a threaded portion 66 and a head 67 and firmly attaches the fork tube 30 to the triple clamp 35. In other constructions, rather than including a threaded bore 50, the fork tube 30 includes a threaded stud extending out of the first end 45. Once inserted into the triple clamp 35, a nut threads onto the threaded portion to connect the triple clamp 35 and the fork tube 30.

The fork bolt 65 is covered by a fastener cover assembly 70 when the components are fully assembled. The fastener cover assembly 70 includes an engaging member in the form of a washer 75, and a cover 80. In this embodiment, the washer 75 is sandwiched between a top surface 90 of the triple clamp 35 and the bolt head 67. The cover 80 attaches to the washer 75 to hide the fork bolt 65 from view.

Figure 3:
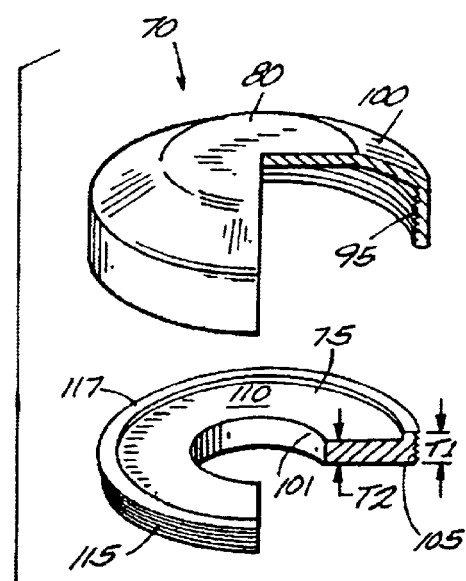
FIG. 3 is a partially cut-away, exploded perspective view of the fastener cover assembly of FIG. 2.

One possible method of attaching the cover 80 to the washer 75 is illustrated in FIG. 3. The illustrated cover 80 includes a first engagement portion 95 that extends from a top surface 100 in a substantially perpendicular direction. The engagement portion 95 includes threads. The washer 75 includes a bore 101 that allows the threaded portion 66 of the fork bolt 65 to pass, while supporting the head 67 of the fork bolt 65. The washer 75 also includes a first surface 105 that engages the top surface 90 of the triple clamp 35 and a second surface 110 that engages the underside of the bolt head 67. A second engagement portion 115 is located on the perimeter of the washer 75 between the first surface 105 and the second surface 110. The washer 75 includes a raised ridge 117 around the perimeter of the washer 75. The raised ridge increases the thickness T1 along the perimeter compared to the thickness T2 of the washer 75. The raised ridge 117 allows a larger engagement surface for the second engagement portion 115 while maintaining a preferred washer thickness T2 directly under the bolt head 67. The second engagement portion 115 includes threads to facilitate engagement with the cover 80.

In another construction, the engagement portions 95, 115 are cammed rather than threaded. Thus, the cover 80 could connect to the washer 75 with less than a full turn of the cover 80. In still other constructions, a simple snap or interference fitting may be employed.

With reference to FIG. 4, one of the fastener cover assemblies 70 is shown in section in the assembled condition. In this construction, the fork bolt 65 includes a shoulder portion 120 sized to fit into the bore 101 of the washer 75. The shoulder portion 120 assures that the washer 75 and the fork bolt 65 are properly aligned with one another. The cover 80 is threaded onto the washer 75 until it contacts the top surface 90 of the triple clamp 35. Engaging the top surface 90 reduces the likelihood of vibration of the cover 80 during motorcycle operation.

In some constructions, a resilient gasket or washer may be placed between the top surface 90 of the triple clamp 35 and the cover 80. To further reduce the possibility of vibration, some constructions may use a lock washer to forcibly lock the cover 80 in the desired position. Still other constructions may use a biasing member such as a spring (e.g., a wave spring), to force the threads between the cover 80 and the washer 75 into tighter engagement, thereby reducing the likelihood of vibration or accidental removal of the cover 80. Still other constructions use glue or other adhesives to lock the cover 80 in the desired position.

Figure 5:
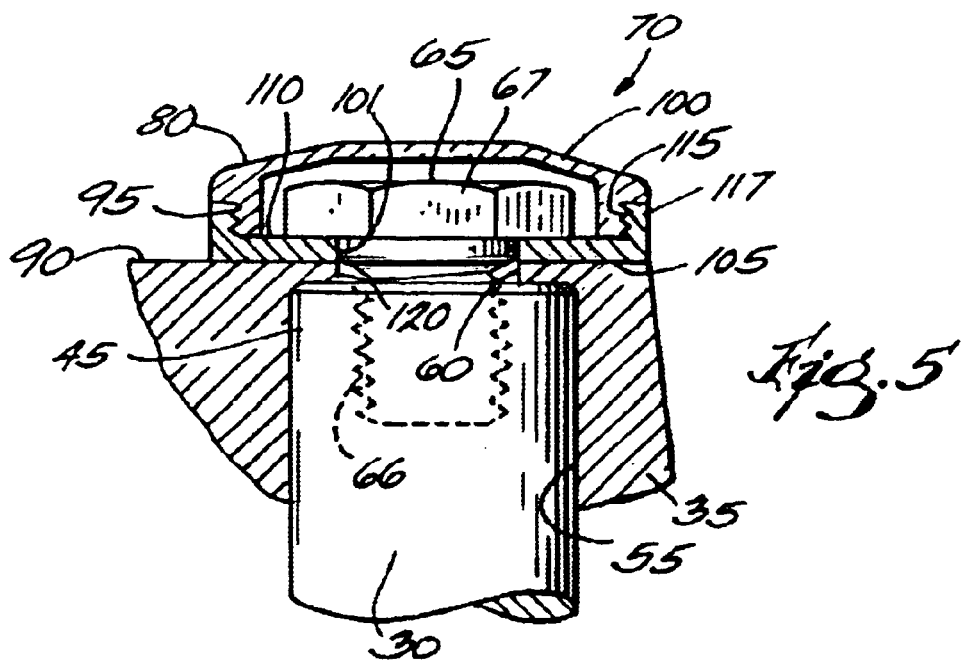
FIG. 5 is a view similar to FIG. 4, illustrating a fastener cover assembly according to another embodiment of the invention.

In another embodiment shown in FIG. 5, the engagement portion 115 of the washer 75 includes threads on an inside diameter of the raised ridge 117 rather than the outside diameter. The cover 80 includes an engagement portion 95 having threads on the outside diameter rather than the inside diameter. When assembled, a portion of the cover 80 is enclosed within the washer 75, while a portion of the washer is visible. Thus, unlike the embodiment illustrated in FIGS. 2–4, this construction does not completely cover the washer 75.

Although the invention has been described in detail with reference to certain preferred embodiments, variations and modifications exist within the scope and spirit of the invention as described and defined in the following claims.

What is claimed is:

1. A motorcycle comprising:
   a frame;
   a triple clamp supported by the frame for rotation relative to the frame, the triple clamp having a surface;
   a triple clamp fastener positioned adjacent to the surface of the triple clamp and defining a top surface opposite the triple clamp surface;
   an engaging member having a first engagement portion, the engaging member positioned between the triple clamp fastener and the surface of the triple clamp; and
   a cover including a second engagement portion engaged with the first engagement portion, the cover covering at least a portion of the top surface of the triple clamp fastener.

2. The motorcycle of claim 1, wherein the triple clamp fastener is a bolt.

3. The motorcycle of claim 1, wherein the engaging member is a washer.

4. The motorcycle of claim 1, wherein the cover contacts the surface of the triple clamp.

5. The motorcycle of claim 1, wherein the triple clamp fastener includes a shoulder portion.

6. The motorcycle of claim 1, wherein the triple clamp fastener includes a bolt having a hex head.

7. The motorcycle of claim 6, wherein the engaging member and the cover cooperate to define a cavity, the hex head disposed substantially within the cavity.

8. The motorcycle of claim 6, wherein the cover at least partially defines a cavity, the hex head and the engaging member disposed substantially within the cavity.

9. A motorcycle comprising:
   a frame;
   a triple clamp supported by the frame for rotation relative to the frame, the triple clamp having a surface;
   a triple clamp fastener positioned adjacent to the surface of the triple clamp;
   an engaging member having a first engagement portion, the engaging member positioned between the triple clamp fastener and the surface of the triple clamp; and
   a cover including a second engagement portion engaged with the first engagement portion, the cover covering at least a portion of the triple clamp fastener,
   wherein the first and second engagement portions are threaded to each other.

10. The motorcycle of claim 9, wherein the engaging member includes a washer.

11. The motorcycle of claim 10, wherein the washer includes a raised ridge around the perimeter of the washer, and wherein the first engagement portion is located on the raised ridge.

12. The motorcycle of claim 9, wherein the engaging member includes a raised ridge around the perimeter of the engaging member, and wherein the first engagement portion is located on the raised ridge.

13. The motorcycle of claim 9, wherein the cover defines an inner portion and an outer portion and wherein the engagement portion is disposed substantially within the inner portion.

14. The motorcycle of claim 9, wherein the triple clamp fastener includes a bolt having a hex head.

15. The motorcycle of claim 14, wherein the engaging member and the cover cooperate to define a cavity, the hex head disposed substantially within the cavity.

16. The motorcycle of claim 14, wherein the cover at least partially defines a cavity, the hex head and the engaging member disposed substantially within the cavity.

17. The motorcycle of claim 9, wherein the engaging member contacts the surface of the triple clamp.

18. The motorcycle of claim 9, wherein the fastener contacts the engaging member such that at least a portion of the engaging member is sandwiched between the triple clamp and the fastener.

19. The motorcycle of claim 9, wherein the triple clamp surface is a top surface and the entire engaging member is disposed above the surface of the triple clamp.

20. A motorcycle comprising:
   a frame;
   a triple clamp supported by the frame for rotation relative to the frame, the triple clamp having a surface;
   a triple clamp fastener positioned adjacent to the surface of the triple clamp;
   an engaging member having a first engagement portion, the engaging member positioned between the triple clamp fastener and the surface of the triple clamp; and
   a cover including a second engagement portion engaged with the first engagement portion, the cover covering at least a portion of the triple clamp fastener,
   wherein the cover defines an inner portion and an outer portion and wherein the engagement portion is disposed substantially within the inner portion.

21. The motorcycle of claim 20, wherein the first and second engagement portions are threaded to each other.

22. The motorcycle of claim 20, wherein the washer includes a raised ridge around the perimeter of the washer, and wherein the first engagement portion is located on the raised ridge.

23. The motorcycle of claim 20, wherein the triple clamp fastener includes a bolt having a hex head.

24. The motorcycle of claim 23, wherein the engaging member and the cover cooperate to define a cavity, the hex head disposed substantially within the cavity.

25. The motorcycle of claim 23, wherein the cover at least partially defines a cavity, the hex head and the engaging member disposed substantially within the cavity.

* * * * *